(12) United States Patent
Hafernik et al.

(10) Patent No.: US 11,530,835 B2
(45) Date of Patent: Dec. 20, 2022

(54) SYSTEM FOR PREVENTIVE MAINTENANCE OF HVAC UNITS

(71) Applicant: Siemens Industry, Inc., Alpharetta, GA (US)

(72) Inventors: Robert Hafernik, Austin, TX (US); Tyrell Craig Vaughn, Manchaca, TX (US); Robert W. Martin, Spicewood, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 17/185,444

(22) Filed: Feb. 25, 2021

(65) Prior Publication Data
US 2022/0268472 A1     Aug. 25, 2022

(51) Int. Cl.
*F24F 11/49* (2018.01)
*G05B 23/02* (2006.01)

(52) U.S. Cl.
CPC .......... *F24F 11/49* (2018.01); *G05B 23/0283* (2013.01)

(58) Field of Classification Search
None
See application file for complete search history.

(56) References Cited

U.S. PATENT DOCUMENTS

| | | | |
|---|---|---|---|
| 9,244,469 B2 | 1/2016 | Vaughn et al. | |
| 10,571,903 B2 | 2/2020 | Simons | |
| 10,724,752 B2 | 7/2020 | Dyess et al. | |
| 2002/0095323 A1 | 7/2002 | Combs et al. | |
| 2006/0275719 A1* | 12/2006 | Hill | F23N 5/20 431/24 |
| 2013/0338836 A1* | 12/2013 | Vaughn | G05D 23/19 700/276 |
| 2015/0261229 A1* | 9/2015 | Roy | G05D 23/1917 700/277 |
| 2016/0132839 A1 | 5/2016 | Randolph | |
| 2016/0334127 A1 | 11/2016 | Rupp et al. | |
| 2018/0031256 A1* | 2/2018 | Gillette | F24F 11/38 |
| 2020/0033019 A1* | 1/2020 | Kitade | G05B 19/042 |
| 2020/0149761 A1 | 5/2020 | Burns et al. | |

OTHER PUBLICATIONS

PCT Search Report dated May 19, 2022, for PCT Application PCT/US2022/015449, 12 pages.

* cited by examiner

*Primary Examiner* — Bernard G Lindsay

(57) ABSTRACT

There is described a system and method of a building management system for preventive maintenance of an HVAC unit. Runtime data of the HVAC unit is received at a control system remote from the HVAC unit. A service message is initiated, by the control system, to a service device associated with the HVAC unit in response to determining that a preventive maintenance visit is warranted based on the runtime data. A hot-cold test for the HVAC unit is activated by the control system in response to receiving the registration message of the preventive maintenance visit from the service device. A validation message is reported in response to validating the preventive maintenance visit based on a result of the hot-cold test for the HVAC unit.

18 Claims, 3 Drawing Sheets

SYSTEM FOR PREVENTIVE MAINTENANCE OF HVAC UNITS

FIELD OF THE INVENTION

This application relates to the field of building management systems and, more particularly, to automating preventive maintenance of heating, ventilation, and air conditioning (HVAC) equipment.

BACKGROUND

Building automation systems encompass a wide variety of systems that aid in the monitoring and control of various aspects of building operation. A building automation system may be used to manage one or more heating, ventilation, and air conditioning (HVAC) units, and each HVAC unit may include sensors and controls located throughout a location. Building automation systems typically have one or more centralized control stations from which system data may be monitored and system operations may be controlled and/or monitored. Systems often employ multi-level communication networks to communicate operational and/or alarm information between operating elements and the centralized control station. One example of a building automation system is available from Siemens Industry, Inc. Building Technologies Division of Buffalo Grove, Ill. ("Siemens").

HVAC units require regular preventive maintenance that may be costly and difficult to manage. Preventive maintenance is generally preformed manually by visiting technicians. Since the HVAC units do not track runtimes, most companies simply order a preventive maintenance visit on a calendar basis: every quarter, twice a year, or something similar. For HVAC units that do not run very often, this conventional approach can result in execution of unnecessary preventive maintenance as well as excessive financial expenditures. For HVAC units that run quite frequently, preventive maintenance may not occur sufficiently, thus resulting in costly damage and environmental inconvenience.

SUMMARY

In accordance with one embodiment of the disclosure, there is provided a preventive maintenance approach for building management systems. For preventative maintenance for an HVAC unit, the state of the unit may be examined after a certain amount of use to verify proper performance, identify worn parts needing replacement, and the like. A control system may receive runtime data associated with certain HVAC units from a building management system. When a preventive maintenance is determined to be warranted based on the received runtime data, a service message may be sent to an available technician to perform maintenance at the HVAC units. Upon completion, the technician may return a registration confirming that the maintenance performance has been performed. The control system may then initiate automatically a "hot-cold test" of HVACs based on a schedule, without any human interaction, after completion of the preventive maintenance. The results, or associated message, may be sent automatically to devices of owners, managers, and/or operators of the HVAC units, acknowledging proper execution of the preventive maintenance.

One aspect is a method of a system for preventive maintenance of an HVAC unit. Runtime data of the HVAC unit is received at a control system remote from the HVAC unit. A service message is initiated, by the control system, to a service device associated with the HVAC unit in response to determining that a preventive maintenance visit is warranted based on the runtime data. A hot-cold test for the HVAC unit is activated by the control system in response to receiving the registration message of the preventive maintenance visit from the service device. A validation message is reported in response to validating the preventive maintenance visit based on a result of the hot-cold test for the HVAC unit.

Another aspect is a system for preventive maintenance that comprises an HVAC unit, a control system remote from the HVAC unit, and a service device. The control system receives runtime data of the HVAC unit, initiates a service message to a service device associated with the HVAC unit in response to determining that a preventive maintenance visit is warranted based on the runtime data, and activates a hot-cold test for the HVAC unit in response to receiving the registration message of the preventive maintenance visit from the service device. A validation message is reported in response to validating the preventive maintenance visit based on a result of the hot-cold test for the HVAC unit.

Yet another aspect is a non-transitory computer readable medium including executable instructions which, when executed, causes at least one processor of a system to perform preventive maintenance of an HVAC unit. Runtime data of the HVAC unit is received. A service message is initiated to a service device associated with the HVAC unit in response to determining that a preventive maintenance visit is warranted based on the runtime data. A hot-cold test for the HVAC unit is activated in response to receiving the registration message of the preventive maintenance visit from the service device. A validation message is reported in response to validating the preventive maintenance visit based on a result of the hot-cold test for the HVAC unit.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
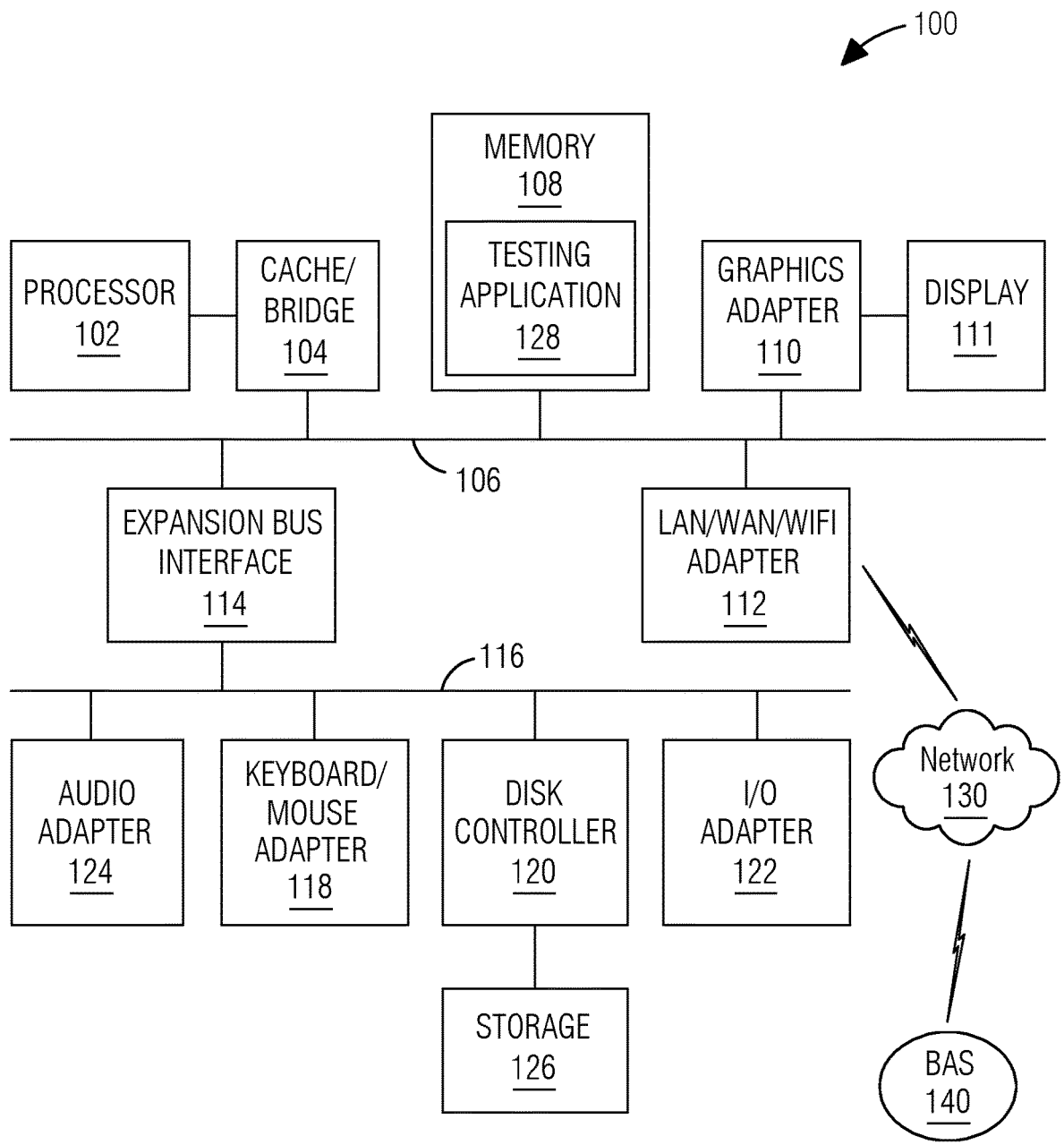
FIG. 1 is a block diagram of a control system in an example implementation that is operable to employ techniques described herein.

Various technologies that pertain to systems and methods that facilitate preventive maintenance of one or more HVAC units will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

The control system for preventive maintenance monitors runtimes for each HVAC unit and reports the runtime data to a central database, where they are subsequently aggregated into periodic totals. Runtime data may be collected for multiple modes such as fan, first stage cool, second stage cool, first stage heat, and/or second stage heat. The control system includes a service device, such as a mobile app operating on a mobile device or a computerized maintenance management system ("CMMS"), that may be used to record the date and time of any preventive maintenance tasks performed on each HVAC unit. A report may be generated on a periodic basis that includes the total runtimes of each HVAC since the most recent performance management. The report may also identify HVAC units that are due for a performance management visit. Subsequent to updating a performance management entry in a central database, the control system may schedule a hot-cold test for the HVAC unit so that the effectiveness of the performance management may be validated. The control system would allow owning or operating entities to avoid many unnecessary performance management tasks each year and save substantial cost.

FIG. 1 depicts a block diagram of a control system 100 in an example implementation that is operable to employ techniques described herein. In particular, the system 100 may include the interconnecting and communicating subsystems and perform the processes described herein, including preventive maintenance of one or more HVAC units. For the embodiment shown in FIG. 1, the control system depicted includes a processor 102 connected to a level two cache/bridge 104, which is connected in turn to a local system bus 106. The local system bus 106 may be, for example, a peripheral component interconnect (PCI) architecture bus. Also connected to the local system bus 106 in the depicted example are a main memory 108 and a graphics adapter 110. The graphics adapter 110 may be connected to an output device, such as a display 111.

Memory 108 may comprise instructions of a testing application 128. The testing application 128 may include instructions and functionality for performing testing on one or more HVAC units as described herein. The instructions for testing application 128 stored in memory 108 may be executed by processor 102 to perform one or more functions for implementing the automated testing of HVAC units as described herein. For example, control system 100 may implement one or more of the functions represented by FIGS. 2 and 3.

Other peripherals, such as a local area network (LAN), Wide Area Network, or Wireless (e.g., Wi-Fi) adapter 112, may also be connected to the local system bus 106. An expansion bus interface 114 may connect the local system bus 106 to an input/output (I/O) bus 116. The I/O bus 116 may be connected to a user interface 118, a storage controller 120, and I/O adapter 122. The storage controller 120 may be connected to a storage unit 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

For some embodiments, an audio adapter 124 may be connected to the I/O bus 116, to which an audio output device (not shown) may be connected for providing sounds or speech. The user interface 118 may provide a connection for an input device (not shown), such as a mouse, trackball, track pointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A control system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash., may be employed if suitably modified. The operating system is modified or created in accordance with the present disclosure as described.

The LAN, WAN, or Wireless adapter 112 may be connected to a network 130 (not a part of control system 100), which may be any public or private control system network or combination of networks, as known to those of skill in the art, including the Internet or Cloud. The control system 100 may communicate over the network 130 with a building automation system (BAS) 140. In addition, the control system 100 may connect to other devices or components via the network 130, such as one or more DZC, sensors, and/or HVAC units and manage testing of these components. In some embodiments, control system 100 is at least a portion of a building automation system.

Figure 2:
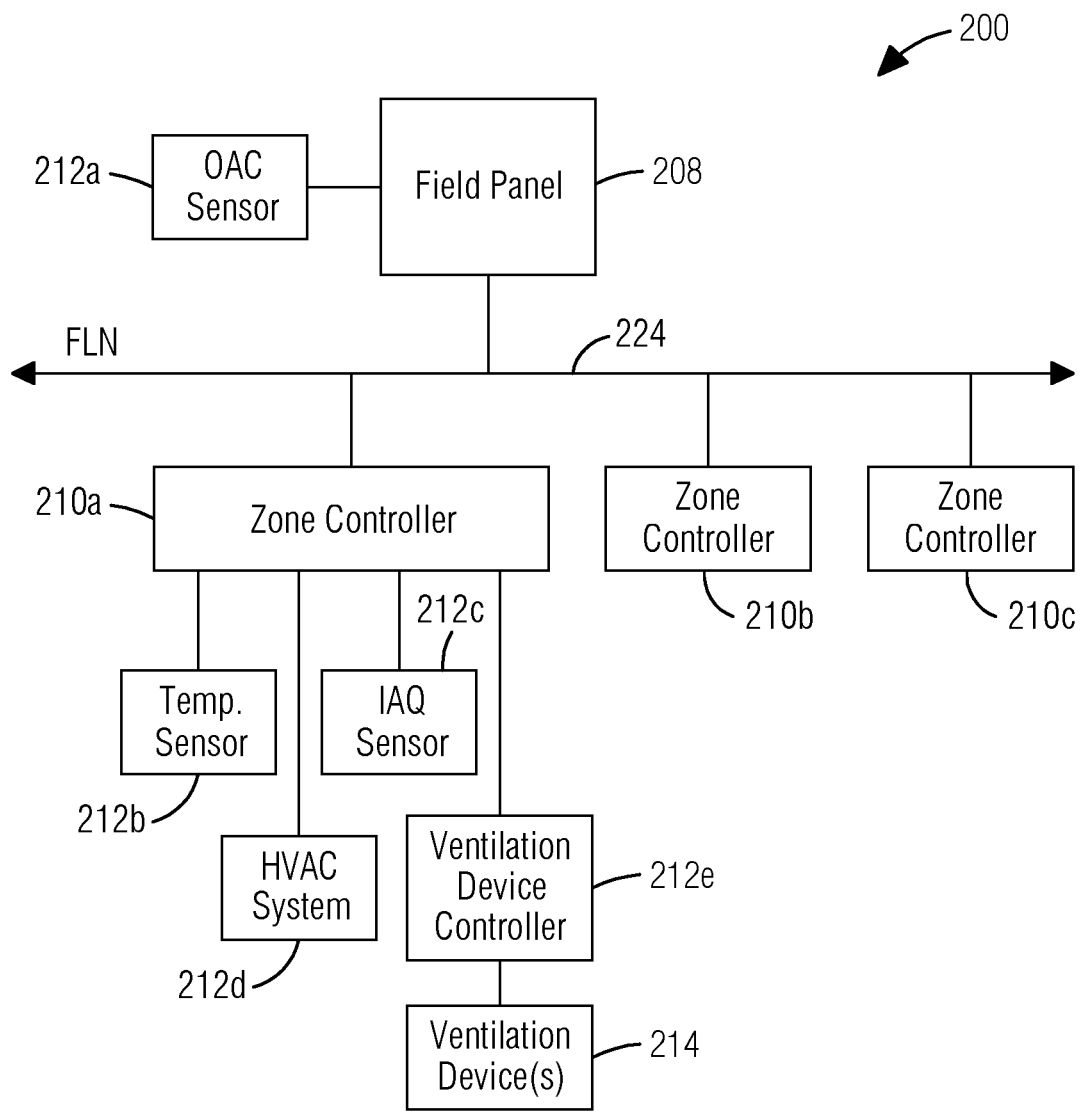
FIG. 2 depicts at least a portion of a building automation system that operates with conjunction with the control system of FIG. 1 and is capable of automated testing of one or more HVAC units in accordance with various embodiments of the present disclosure.

FIG. 2 illustrates at least a portion of a building automation system 200, which communicates with the control system 100 and is capable of providing runtimes for one or more HVAC modes and automated testing of one or more HVAC units in accordance with the present disclosure. Examples of HVAC modes include, but are not limited to, a fan mode, a first stage cool mode, a second stage cool mode, a first stage heat mode, and/or a second stage heat mode. For the particular embodiment illustrated in FIG. 2, the system 200 comprises a field panel 208, multiple zone controllers 210a-c (e.g., a DZC), and example field devices 212a-e associated with each zone controller. However, it will be understood that the system 200 may comprise any suitable number of these components without departing from the scope of this disclosure.

For some embodiments, a facility or other area in which an HVAC unit is implemented may comprise a single zone. For these embodiments, the system 200 may comprise a single zone controller, such as the zone controller 210a. However, for other embodiments, such as in a relatively large building, the building may comprise two or more zones. For example, in a retail store, the public area may comprise one zone, while a back storage area may comprise another zone. For the illustrated example, the system 200 comprises three such zones, each of which has a corresponding zone controller 210a-c.

The embodiment of FIG. 2 comprises five example field devices 212a-e. As described below, these field devices 212 comprise an outside air conditions (OAC) sensor 212a, a temperature sensor 212b, an indoor air quality (IAQ) sensor 212c, an HVAC unit 212d, and a ventilation device controller 212e. Although the illustrated embodiment shows only the zone controller 210a coupled to a temperature sensor 212b, an IAQ sensor 212c, an HVAC unit 212d and a ventilation device controller 212e, it will be understood that each of the zone controllers 210b and 210c may also be coupled to similar field devices 212b-e for its associated zone.

For some embodiments, the field panel 208 may be coupled to the OAC sensor 212a. The OAC sensor 212a is configured to sense parameters, such as temperature, humidity and/or the like, associated with the air outside the building. The OAC sensor 212a is also configured to generate an OAC signal based on the outside air conditions and send the OAC signal to the field panel 208. For other embodiments, the OAC sensor 212a may be coupled to one of the zone controllers 210 or other component of the system 200, such as a site controller, and may be configured to send the OAC signal to that other component. For some embodiments, such as those that provide conventional demand control ventilation, the OAC sensor 212a may be coupled to the zone controller 210a and the system 200 may be provided without the FLN 224. For these embodiments, the zone controllers 210 may be independent from, and incapable of communicating with, the other zone controllers 210.

The temperature sensor 212b is configured to sense the temperature of the zone associated with the zone controller 210a and to report the sensed temperature to the zone controller 210a. The IAQ sensor 212c is configured to sense the level of $CO_2$ and/or other contaminants in the zone and to report the sensed contaminant level to the zone controller 210a. For some embodiments, the IAQ sensor 212c may be configured to sense the level of contaminants in the entire building. For these embodiments, the system 200 may comprise a single IAQ sensor 212c coupled to a single zone controller 210a, a field panel 208 or other suitable component, instead of an IAQ sensor 212c coupled to each zone controller 210a-c. The HVAC unit 212d may comprise a rooftop HVAC unit, an air handler unit, or any other suitable type of unit capable of providing heating, ventilation, and cooling for the building. In addition, it will be understood that the system 200 may comprise any combination of various types of HVAC units. For example, the HVAC unit 212d may comprise a rooftop HVAC unit, while the zone controller 210b may be coupled to an air handler unit and the zone controller 210c may be coupled to yet another type of HVAC unit.

The ventilation device controller 212e is coupled to a ventilation device or devices 214 and is configured to control the operation of the ventilation device 214. For some embodiments that provide conventional demand control ventilation, the ventilation device 214 may comprise a damper on the HVAC unit 212d, and the ventilation device controller 212e may comprise a damper actuator that is configured to open and close the damper. For these embodiments, the damper actuator may open or close the damper based on a ventilation signal from the zone controller 210a, as described in more detail below.

The zone controller 210a may be installed in or near a room in which the HVAC unit 212d is located, in a back office, or in any other suitable location in the building. The OAC sensor 212a may be installed outside the building. The temperature sensor 212b may be installed in the zone associated with the zone controller 210a. The IAQ sensor 212c may be installed in the zone associated with the zone controller 210a or, for embodiments in which only a single IAQ sensor is implemented in the building, in a central location in the building. The HVAC unit 212d may be installed on the roof of the building, adjacent to the building, or in any other suitable location. The ventilation device controller 212e may be installed in the zone associated with the zone controller 210a and/or near the ventilation device 214. It will be understood that each of the components of the system 200 may be located in any suitable location without departing from the scope of the present disclosure.

The zone controller 210a is configured to monitor the temperature of its zone based on a temperature signal from the temperature sensor 212b and to monitor the contaminant-level of the zone based on an IAQ signal from the IAQ sensor 212c. The zone controller 210a is also configured to activate or deactivate the HVAC unit 212d to provide heating or cooling based on the temperature signal. The zone controller 210a is also configured to switch the zone between a ventilation mode and an economizing mode based on the temperature signal provided by the temperature sensor 212b and the OAC signal provided by the OAC sensor 212a, which may be provided via the field panel 208 for some embodiments.

Figure 3:
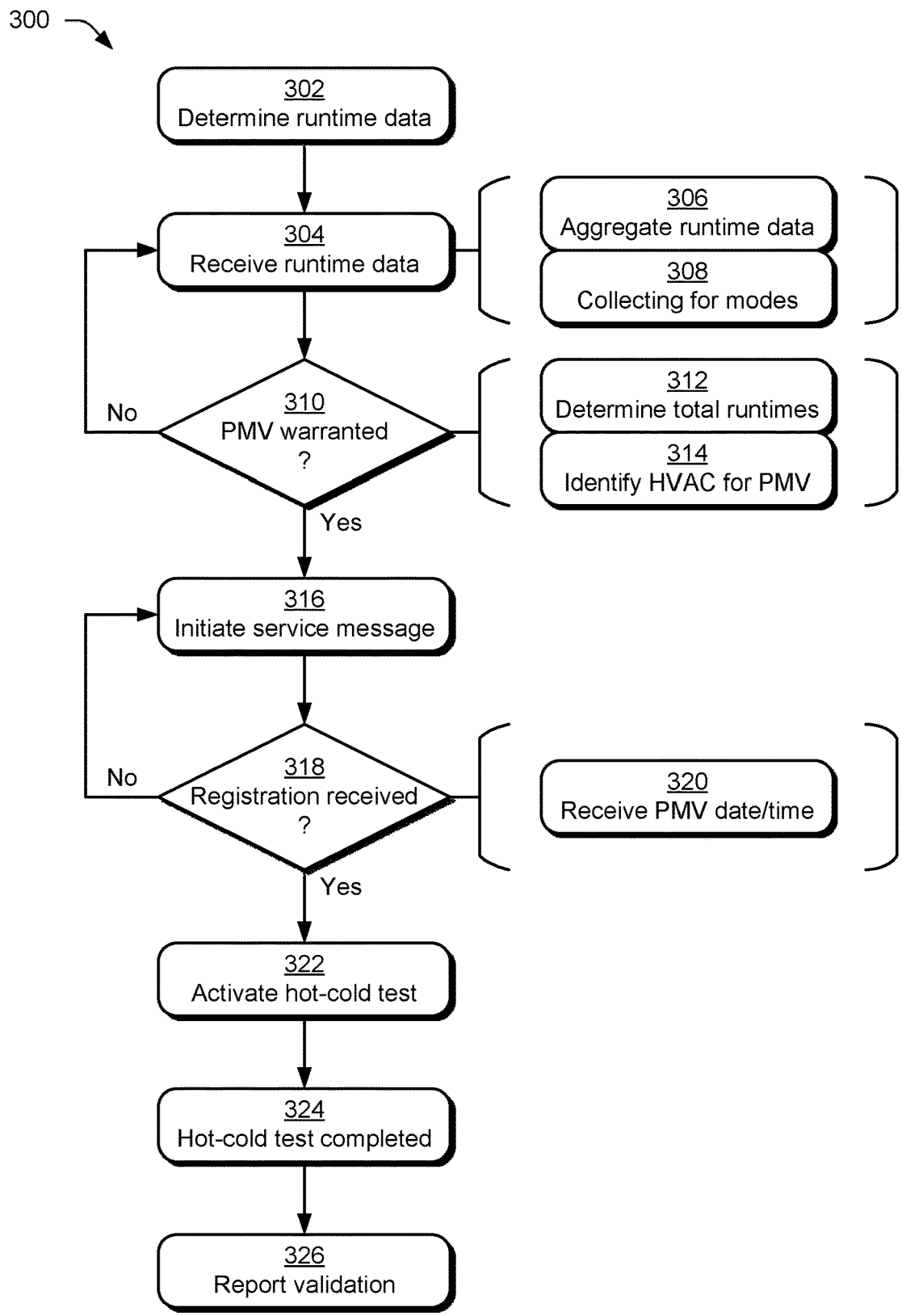
FIG. 3 illustrates a flow diagram of an example process for executing preventive maintenance, including heating and cooling tests, of one or more HVAC units.

FIG. 3 represents an example operation by the control system 100 for preventive maintenance of one or more HVAC units. Runtime data is generated and/or collected for the preventive maintenance operation (302). The runtime data may be generated that control system 100 or provided by an external source, such as the building automation system 140, 200 or HVAC unit(s) 212d. For example, a building management system may collect data on energy consuming devices and generate energy usage and performance data, such as the runtime data. For some embodiments, the runtime data may be determined based on start and stop times of air flow in one or more air ducts of the HVAC unit 212d.

To illustrate by example, the building management system 140, 200 may report runtime minutes for every hour of the day to a remote system, such as the control system 100. For this example, the building management system may gather all of the minutes of runtime for all HVAC units and record the daily total to a central database. The central database may be located at the control system 100, such as the storage 126, or communicate with the control system, building management system 140, 200, and/or HVAC units 212d via the network 130. Accordingly, the control system 100 may determine how much each HVAC has been operated since a given time period and/or when a preventive maintenance was last performed.

The control system 100 associated with the HVAC unit(s) 212d receives runtime data of the HVAC unit (304). For some embodiments, the runtime data may be aggregated on a periodic basis into periodic totals at the control system (306). The runtime data of the HVAC unit 212d received by the control system 100 or otherwise collected may include fan runtimes, heating runtimes, cooling runtimes, or a combination of runtimes (308). The runtime data may include data associated with multiple modes, including one or more modes of a fan mode, a first stage cool mode, a second stage cool mode, a first stage heat mode, or a second stage heat mode.

The control system 100 determines whether a preventive maintenance visit is warranted (310) for one or more HVAC units 212d. For some embodiments, the control system 100 may determines a total runtime of each HVAC unit 212d since a last preventive maintenance of the HVAC unit or units (312). For some embodiments, the control system 100 identifies one or more selected HVAC units 212d in which a preventive maintenance visit is warranted based on the total runtime of each HVAC unit (314).

In response to determining that a preventive maintenance visit is warranted based on the runtime data (310), the control system 100 initiates a service message to one or more service devices, such as a mobile device and/or computerized maintenance management system (CMMS), associated with the HVAC unit 212d (316). Examples of mobile devices include, but are not limited to, wireless communication devices (such as smartphones and cellular phones), wireless computing devices (such as laptops and tablets), and other electronic communication devices operated by technicians. A CMMS includes a computer database of information about an entity's maintenance operations and may be used to notify a customer CMMS when runtime indicates that preventive maintenance is, or should be, scheduled. For some embodiments, the control system 100 may send a temporary login link for a single site and single purpose that is geofenced and can be sent to a technician's service device via text message, a customer's CMMS account, or other forms of communication. When a preventive maintenance is called for, the control system 100 automatically sends the service message, such as a "PM Link" to the service device or devices. The service message may identify which HVAC units 212d to service and/or which HVAC units not to service.

Subsequent to sending the service message (316), the control system 100 may receive a registration message of the preventive maintenance from the service device (318). For example, the technician of the service device may click the "PM Link" to confirm that the preventive maintenance has taken place. For some embodiments, the control system 100 may receive a message from a service device that indicates a date and/or time for the preventive maintenance visit (320).

In response to receiving the registration message of the preventive maintenance visit from the service device (318), the control system 100 may activate a hot-cold test for the HVAC unit 212d (322).For example, the building management unit 140, 200 and/or each HVAC unit 212d may perform the hot-cold test in response to receiving an activation message or signal from the control system 100. For some embodiments, the hot-cold test is executed in response to receiving the activation message or signal from the control system 100. For some embodiments, the control system 100, the building automation system 140, 200, and/or the HVAC units activate the hot-cold test automatically based on a schedule, in which no human interaction is required. In such case, when a preventive maintenance has taken place (such as, the technician's selection of the "PM Link"), a "Post PM Hot-cold Test" may be scheduled.

The control system 100 receives a completion notification that the HVAC unit has completed performance of the hot-cold test (324) in response to the completion of the hot-cold test. Once the hot-cold test runs, the results of the test may be stored at the control system 100 (such as the storage 126), the building management system 140, 200, and/or HVAC units 212d.

The control system 100 may report a validation message in response to validating the preventive maintenance visit based on a result of the hot-cold test for the HVAC unit (326). For example, the test results may be automatically communicated to the owner, operator, maintenance personnel, technician, or other entity associated with the HVAC unit or units. The entity would then have greater confidence that the preventive maintenance was performed correctly.

Those skilled in the art will recognize that, for simplicity and clarity, the full structure and operation of all control systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A method of a system for preventive maintenance of a heating, ventilation, and air conditioning (HVAC) unit, the method comprising:

receiving, at a control system associated with the HVAC unit, runtime data of the HVAC unit, wherein receiving the runtime data of the HVAC unit includes aggregating the runtime data on a periodic basis into periodic totals at the control system;

initiating, by the control system, a service message to a service device associated with the HVAC unit in response to determining that a preventive maintenance visit is warranted based on the runtime data, wherein the service message includes a geofenced login link for a site;

activating, by the control system, a hot-cold test for the HVAC unit in response to receiving a registration message of the preventive maintenance visit from the service device; and reporting a validation message in response to validating the preventive maintenance visit based on a result of the hot-cold test for the HVAC unit.

2. The method as described in claim 1, further comprising determining the runtime data based on at least one of (a) an amount of time the control system is requesting the HVAC unit to run in a particular mode or (b) start and stop times of air flow in at least one air duct of the HVAC unit.

3. The method as described in claim 1, wherein receiving the runtime data of the HVAC unit includes collecting runtimes for a plurality of modes, the plurality of modes including at least one mode of a fan mode, a first stage cool mode, a second stage cool mode, a first stage heat mode, or a second stage heat mode.

4. The method as described in claim 1, wherein determining that the preventive maintenance visit is warranted comprises:
  determining a total runtime of each HVAC unit of a plurality of HVAC units since a last preventive maintenance of at least one HVAC unit; and
  identifying at least one selected HVAC unit in which a preventive maintenance visit is warranted based on the total runtime of each HVAC unit.

5. The method as described in claim 1, wherein receiving the registration message of the preventive maintenance visit includes receiving a date and/or time for the preventive maintenance visit from the service device.

6. The method as described in claim 1, further comprising receiving completion notification that the HVAC unit has completed performance of the hot-cold test.

7. A system for preventive maintenance of a heating, ventilation, and air conditioning (HVAC) unit comprising:
  a control system associated with the HVAC unit, the control system receiving runtime data of the HVAC unit, aggregates the runtime data on a periodic basis into periodic totals, initiating a service message to a service device associated with the HVAC unit in response to determining that a preventive maintenance visit is warranted based on the runtime data, and activating a hot-cold test for the HVAC unit in response to receiving a registration message of the preventive maintenance visit from the service device,
  wherein the service message includes a geofenced login link for a site, and
  wherein a validation message is reported in response to validating the preventive maintenance visit based on a result of the hot-cold test for the HVAC unit.

8. The system as described in claim 7, wherein the runtime data is determined based on at least one of (a) an amount of time the control system is requesting the HVAC unit to run in a particular mode or (b) start and stop times of air flow in at least one air duct of the HVAC unit.

9. The system as described in claim 7, wherein the runtime data of the HVAC unit includes runtimes for a plurality of modes, the plurality of modes including at least one mode of a fan mode, a first stage cool mode, a second stage cool mode, a first stage heat mode, or a second stage heat mode.

10. The system as described in claim 7, wherein the control system identifies at least one selected HVAC unit in which a preventive maintenance visit is warranted based on a total runtime of each HVAC unit of a plurality of HVAC units since a last preventive maintenance of at least one HVAC unit.

11. The system as described in claim 7, wherein the registration message of the preventive maintenance visit includes a date and/or time for the preventive maintenance visit from the service device.

12. The as described in claim 7, wherein the control system is notified that the HVAC unit has completed performance of the hot-cold test.

13. A non-transitory computer readable medium including executable instructions which, when executed, causes at least one processor of a system for preventive maintenance of a heating, ventilation, and air conditioning (HVAC) unit by:
  receiving runtime data of the HVAC unit;
  aggregating the runtime data on a periodic basis into periodic totals;
  initiating a service message to a service device associated with the HVAC unit in response to determining that a preventive maintenance visit is warranted based on the runtime data, wherein the service message includes a geofenced login link for a site;
  receiving a registration message of the preventive maintenance visit from the service device;
  activating a hot-cold test for the HVAC unit in response to receiving the registration message of the preventive maintenance visit from the service device; and
  reporting a validation message in response to validating the preventive maintenance visit based on a result of the hot-cold test for the HVAC unit.

14. The medium as described in claim 13, further comprising determining the runtime data based on at least one of (a) an amount of time the control system is requesting the HVAC unit to run in a particular mode or (b) start and stop times of air flow in at least one air duct of the HVAC unit.

15. The medium as described in claim 13, wherein receiving the runtime data of the HVAC unit includes collecting runtimes for a plurality of modes, the plurality of modes including at least one mode of a fan mode, a first stage cool mode, a second stage cool mode, a first stage heat mode, or a second stage heat mode.

16. The medium as described in claim 13, wherein determining that the preventive maintenance visit is warranted comprises:
  determining a total runtime of each HVAC unit of a plurality of HVAC units since a last preventive maintenance of at least one HVAC unit; and
  identifying at least one selected HVAC unit in which a preventive maintenance visit is warranted based on the total runtime of each HVAC unit.

17. The medium as described in claim 13, wherein receiving the registration message of the preventive maintenance visit includes receiving a date and/or time for the preventive maintenance visit from the service device.

18. The medium as described in claim 13, further comprising notifying the control system that the HVAC unit has completed performance of the hot-cold test.

* * * * *